US009335884B2

(12) United States Patent
Paek et al.

(10) Patent No.: US 9,335,884 B2
(45) Date of Patent: May 10, 2016

(54) WAVE LENS SYSTEMS AND METHODS FOR SEARCH RESULTS

(75) Inventors: Timothy S. Paek, Sammamish, WA (US); Susan T. Dumais, Kirkland, WA (US); Ronald K. Logan, Everett, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 574 days.

(21) Appl. No.: 10/809,172

(22) Filed: Mar. 25, 2004

(65) Prior Publication Data
US 2005/0216859 A1   Sep. 29, 2005

(51) Int. Cl.
*G06F 17/30* (2006.01)
*G06F 7/00* (2006.01)
*G06F 3/0481* (2013.01)

(52) U.S. Cl.
CPC .................................. *G06F 3/0481* (2013.01)

(58) Field of Classification Search
USPC ................................................ 707/102, 722
See application file for complete search history.

(56) References Cited

U.S. PATENT DOCUMENTS

| 5,995,101 | A | 11/1999 | Clark et al. | |
|---|---|---|---|---|
| 6,734,883 | B1 | 5/2004 | Wynn et al. | 715/830 |
| 6,768,497 | B2* | 7/2004 | Baar et al. | 345/661 |
| 2002/0083101 | A1* | 6/2002 | Card et al. | 707/526 |
| 2002/0089520 | A1 | 7/2002 | Baar et al. | |
| 2002/0129051 | A1 | 9/2002 | Abdelhadi et al. | 715/501.1 |
| 2002/0129114 | A1 | 9/2002 | Sundaresan et al. | 709/213 |
| 2002/0180801 | A1 | 12/2002 | Doyle et al. | |
| 2003/0146939 | A1* | 8/2003 | Petropoulos et al. | 345/810 |
| 2004/0030741 | A1* | 2/2004 | Wolton et al. | 709/202 |
| 2004/0125143 | A1* | 7/2004 | Deaton et al. | 345/765 |
| 2005/0086217 | A1* | 4/2005 | Kraft et al. | 707/3 |
| 2005/0114778 | A1* | 5/2005 | Branson et al. | 715/711 |
| 2005/0168488 | A1* | 8/2005 | Montague | 345/659 |
| 2007/0130540 | A1* | 6/2007 | Doyle et al. | 715/801 |
| 2007/0156677 | A1* | 7/2007 | Szabo | 707/5 |

FOREIGN PATENT DOCUMENTS

| CN | 1439131 A | 8/2003 |
|---|---|---|
| JP | 5061633 A | 3/1993 |
| JP | 7049881 A | 2/1995 |
| JP | 7262211 A | 10/1995 |
| JP | 11154153 A | 6/1999 |

(Continued)

OTHER PUBLICATIONS

Pook, Stuart. "Interaction and Context in Zoomable User Interfaces." Thesis Presented for the Degree of Doctor of the Ecole Nationale Superieure des Telecommunications. ENST: 2002.*

(Continued)

*Primary Examiner* — Kimberly Wilson
(74) *Attorney, Agent, or Firm* — Alin Corie; Sandy Swain; Micky Minhas

(57) ABSTRACT

The present invention relates to a system and methodology for dynamic presentation of search result information within a selected area of a display. In one aspect, a computerized interface for data presentation is provided. The system includes a lens component associated with a portion of a user interface display, wherein the lens component defines an area to display information from at least one search result. A layout component displays a detailed subset of information within the lens component based upon the search result.

24 Claims, 12 Drawing Sheets

(56) References Cited

FOREIGN PATENT DOCUMENTS

| JP | 2000089877 A | 3/2000 |
|----|--------------|--------|
| JP | 2003256476 A | 9/2003 |
| JP | 2004038271 A | 2/2004 |
| JP | 2004062648 A | 2/2004 |
| RU | 2202856 C2 | 4/2003 |
| RU | 2202859 C2 | 4/2003 |
| WO | WO0113266 A2 | 2/2001 |

OTHER PUBLICATIONS

Roberts, Jonathan C. and Edward Suvanaphen. "Visual Bracketing for Web Search Result Visualization." IEEE 1093-9547/03. 2003.*
Pook, Stuart, Eric Lecolinet, Guy Vaysseix and Emmanuel Barillot. "Context and Interaction in Zoomable User Interfaces." ACM 1-58113-252-2/00/0005. 2000.*
Furnas, George. "Generalized Fisheye Views." ACM 0-89791-6/86/0400. 1986.*
Turetket, Ozgur and Ramesh Sharda. "Visualiztion Support for Managing Information Overload in the Web Environment." Proceedings of the Seventh International Conference on Information Visualization. IEEE: 2003.*
Stuart Pook et al., Context and Interaction in Zoomable User Interfaces, Proc. Working Conf. on Advanced Visual Interfaces 227 (2000).*
Tim Paek, et al., WaveLens: A New View onto Internet Search Results, CHI 2002, Apr. 24-29, 2004, pp. 727-734, Vienna, Austria.
Harold Weinreich, et al., The Look of the Link-Concepts for the User Interface of Extended Hyperlinks, HT'01, Aug. 2001, pp. 19-28, Aarhus, Denmark.
Susan Dumais, et al., Optimizing Search by Showing Results in Context, SIGCHI'01, Mar. 31-Apr. 4, 2001, pp. 277-284, Seattle, Washington, USA.
Dominic Stanyer, et al., Link Lens: An Enhanced Link User Interface for Web Browsers, Proceedings of WWW8, 1999, 15 pages.
Jeff Conklin, Hyptertext: An Introduction and Survey, IEEE Computer, Sep. 1987, pp. 17-41, vol. 20, Issue 9.
Offer Drori, How to Display Search Results in Digital Libraries—User Study, Proceedings of the 3rd International Workshop on New Developments in Digital Libraries, NDDL, 2003, pp. 13-28.
Susan Dziadosz and Raman Chandrasekar, Do Thumbnail Preview Help Users Make Better Relevance Decisions about Web Search Results?, Proceedings of SIGIR, 2002, pp. 365-366.
Accessible at Fazzle, http://www.fazzle.com, last accessed at Nov. 14, 2005.
George W. Furnas, Generalized Fisheye Views, Proceedings of CHI, 1986, pp. 16-23.
George W. Furnas, Effective View Navigation, Proceedings of CHI, 1997, pp. 367-374.
Accessible at Google Labs, http://labs.google.com, last accessed at Nov. 14, 2005.
Scott R. Klemmer, Michael Thomsen, Ethan Phelps-Goodman, Robert Lee, and James A. Landay, Where Do Web Sites Come From? Capturing Design and History, Proceedings of CHI, 2002, CHI Letters(4), pp. 1-8.
Theodorich Kopetzky and Max Muhlhauser, Visual Preview for Link Traversal on the WWW, Proceedings of WWW8, 1999, 12 pages.
George P. Landow, Relationally Encoded Links and the Rhetoric of Hypertext, Proceedings of Hypertext, 1987, pp. 331-343.
Y. K. Leung and M. D. Apperley, A Review and Taxonomy of Distortion-Oriented Presentation Techniques, ACM ToCHI, 1994, pp. 126-160, vol. 1, No. 2.
Jock D. Mackinlay, George G. Robertson, and Stuart K. Card, The Perspective Wall: Detail and Context Smoothly Integrated, Proceedings of CHI, 1991, pp. 173-179, ACM Press.
Gary Marchionini and Ben Shneiderman, Finding Facts vs. Browsing Knowledge in Hypertext Systems, IEEE Computer, Jan. 1998, pp. 70-80.
Jakob Nielsen, Jakob Nielsen's Alertbox for Jan. 11, 1998: Using Link Titles to Help Users Predict Where They Are Going, 1998, accessible at http://www.useit.com/alertbox/980111.html, last accessed at Nov. 14, 2005.
Ryen W. White, Ian Ruthven, and Joemon M. Jose, Finding Relevant Documents Using Top Ranking Sentences: An Evaluation of Two Alternative Schemes, Proceedings of SIGIR, 2002, pp. 57-64.
Allison Woodruff, Andrew Faulring, Ruth Rosenholtz, Julie Morrison, and Peter Pirolli, Using Thumbnails to Search the Web, Proceedings of CHI, 2001, pp. 198-205.
Polle T. Zellweger, Bay-Wei Chang, and Jock D. Mackinlay, Fluid Links for Informed and Incremental Link Transitions, Proceedings of Hypertext, 1998, pp. 50-57.
Yiming Yang, Jian Zhang, Jaime Carbonell, and Chun Jin, Topic-conditioned Novelty Detection, Proceedings of the International Conference of Knowledge Discovery and Data Mining, 2002, pp. 688-693.
Canadian Office Action mailed Oct. 23, 2012 for Canadian patent application No. 2502046, a counterpart foreign application of U.S. Appl. No. 10/809,172, 5 pages.
European Office Action mailed Aug. 18, 2011 for European patent application No. 05102260.6, a counterpart foreign application of U.S. Appl. No. 10/809,172, 9 pages.
Evseev, "Windows XP. Full Reference Book in Questions and Answers", ACT Press, Kniga, 2003, 10 pgs.
IBM, "Electronic Magnifying Glasses", IBM Technical Disclosure Bulletin, International Business Machines Corp., vol. 37, No. 3, Mar. 1, 1994, pp. 353-354.
Translated Japanese Office Action mailed Dec. 22, 2011 for Japanese patent application No. 2005-88231, a counterpart foreign application of U.S. Appl. No. 10/809,172, 6 pages.
Korean Office Action mailed Jun. 20, 2011 for Korean patent application No. 10-2005-24876, a counterpart foreign application of U.S. Appl. No. 10/809,172, 8 pgs.
Translated Japanese Office Action mailed Sep. 4, 2012 for Japanese patent application No. 2005-88231, a counterpart foreign application of U.S. Appl. No. 10/809,172, 6 pages.
Canadian Office Action mailed Sep. 26, 2013 for Canadian patent application No. 2502046, a counterpart foreign application of U.S. Appl. No. 10/809,172, 6 pages.
Indian Office Action mailed Jul. 23, 2013 for Indian patent application No. 522/DEL/2005, a counterpart foreign application of U.S. Appl. No. 10/809,172, 2 pages.
"Office Action Issued in European Patent Application No. 05102260.6", Mailed Date: Nov. 11, 2014, 7 Pages.
Australian office action mailed Oct. 21, 2009, for Australian patent application No. 2005201323, a counterpart foreign application of U.S. Appl. No. 10/809,172, 2 pages.
Chinese Office Action mailed Jan. 18, 2008 for Chinese patent application No. 200510060161.0, a counterpart foreign application of U.S. Appl. No. 10/809,172, 18 pages.
European Search Report mailed Sep. 2, 2010, for European patent application No. EP 02102260.6, a counterpart foreign application of U.S. Appl. No. 10/809,172, 5 pages.
Japanese Office Action mailed Dec. 14, 2010 for Japanese patent application No. 2005-88231, a counterpart foreign application of U.S. Appl. No. 10/809,172, 5 pages.
Japanese Office Action mailed Dec. 22, 2011 for Japanese patent application No. 2005-88231, a counterpart foreign application of U.S. Appl. No. 10/809,172, 6 pages.
Japanese Office Action mailed Jul. 8, 2011 for Japanese patent application No. 2005-88231, a counterpart foreign application of U.S. Appl. No. 10/809,172, 3 pages.
Mexican Office Action mailed Aug. 30, 2007 for Mexican patent application No. PA/a/2005/003098, a counterpart foreign application of U.S. Appl. No. 10/809,172, 3 pages.
Russian Notice of Allowance Action mailed May 20, 2009 for Russian patent application No. 2005108416, a counterpart foreign application of U.S. Appl. No. 10/809,172, 15 pages.
Russian Office Action mailed Nov. 24, 2008 for Russian patent application No. 2005108416, a counterpart foreign application of U.S. Appl. No. 10/809,172, 4 pages.

* cited by examiner

Research Study

Search Results for the Query: diabetes

Back

1. American Diabetes Association
Nonprofit health organization provides diabetes research, information, and advocacy. Get tips on living with diabetes, make a donation, or volunteer locally.... What to Do When You Have Type 2 Diabetes is a pocket-sized companion to help you through the period after you've been
www.diabetes.org 2. National Institute of Diabetes & Digestive & Kidney Diseases
Informative resource for the public, patients and health-care providers.
Browse health articles and frequently asked questions.... National Institute of Diabetes and Digestive and Kidney Diseases (NIDDK) is part of the National Institutes of Health, .... Quick Quick Links for InvestigatorsOffice of the DirectorExtramural ActivitiesIntramural ResearchNutrition Research CoordinationKidney, Urologic & HematologicDiabetes, Endocrinology & Metabolic Digestive Diseases & NutritionOffice of Minority Health Research Coordination... Diabetes Digestive Endocrine & metabolic Hematologic Kidney Nutrition Urologic Statistics Weight loss & control Easy-to-read versions Spanish-language versions.... Diabetes (NDEP) Kidney Disease (NKDEP)... Research Opportunities: Type 1 Diabetes Special Funding Program.... HHS reports progress in type 1 diabetes research through special funding... National Institute of Diabetes and Digestive and Kidney Diseases (NIDDK) is part of the National Institutes of Health, Bethesda, MD. USA..... End of text
www.niddk.nih.gov 3. Diabetes
Web site for Diabetes.... The American Diabetes Association publishes Diabetes. Stanford University Libraries' HighWire Press (TM) assists in the ...
diabetes.diabetesjournals.org 4. National Diabetes Education Program Find the web site which contains the answer to this question:

Question
Which site relates that "17 million Americans have diabetes"?

You are currently exploring Summary list of search results.

Answer
I believe the web site which contains the answer is:
2. National Institute of Diab ▼

Found it!

WAVE LENS SYSTEMS AND METHODS FOR SEARCH RESULTS

TECHNICAL FIELD

The present invention relates generally to computer systems, and more particularly to a system and methods that provide enriched control and presentation of results to a user in accordance with a parameter controlled lens.

BACKGROUND OF THE INVENTION

The cognitive demands associated with choosing whether or not to follow a link from a list of search results has long been noted in the context of general hypertext research. Research on rhetoric of departure and more recent work on information scent or residue highlight the importance of showing readers cues about information that may be found at the destination. Early hypertext systems such as Hyperties provided short summaries or glosses of each link at the bottom of the page, whereas other systems use "tool tips" or "hover text" to show additional content as a pop-up window. Other researchers have explored the use of "fluid links", and more generally fluid documents, to show additional information about hyperlinks using a variety of different presentation techniques (e.g., inline, inline in smaller font, in the margin, as a textual overlay, etc.) Still yet other research has also explored link previews in the context of general web browsing using ideas motivated by research on magic lens filters. Much of this work on link previews focuses on system architecture and not on usability of the resulting systems. In addition, the work does not specifically address information presentation for search results.

One of the most common presentation techniques for displaying web search results is to show the title, URL and a short summary or gloss of each result. The summaries are sometimes the first few lines of the destination web page. More recently, query-biased summaries, which show sentence fragments that match one or more query terms, have become popular. There is some experimental evidence to support this choice as a means of helping people decide which links to follow, although very few queries were systematically evaluated. The use of key sentences extracted from the text on destination pages has also been tried recently with encouraging results for improving web searching, although again few queries were systematically evaluated. Thumbnails of web pages have also been examined as a technique for providing additional information about the content of destination pages.

Several of these techniques for enhanced content presentation of search results are static, in the sense that they appear for all search results and independent of user interactions. Internet search results are typically displayed as a list conforming to a static style sheet. The difficulty of perusing this list can be exacerbated when screen real estate is limited, as for instance, when using a laptop. When visual space is limited, either, few results are seen, in which case, scrolling may be required to find some relevant results, or result descriptions are abbreviated, in which case, it is often difficult to know whether to follow a particular web link.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to automatic and dynamic presentation of search result information in accordance with an adjustable viewing lens that balances the need to examine a plurality of search results while promoting, expanding, or highlighting information of interest within the lens. In one aspect, a "Wave Lens" technique is provided that is motivated in part by a tradeoff between showing more descriptive content in search results in view of the possible loss of other search results outside a selected window frame. Thus, more detailed information is selectively presented within the lens while providing a balanced or minimized view of other results that may remain outside the lens. The Wave Lens technique utilizes a fisheye lens (or area defining parameter) to compact the number of search results that can be seen without scrolling. In order to show more descriptive content as desired, additional page content can be progressively exposed based on mouse activity, such as hover or click. By integrating a fisheye or other type lens with the insertion of additional content (e.g., text insertion, thumbnails of the web page, information about size of result, download speed, recency of the page), the Wave Lens technique allows the layout of a search result list to be dynamically adapted to user interaction. This includes providing various user parameters for controlling the lens and display content such as progressive exposure of more focal content, and optional de-emphasis of non-focal content. Thus, the subject invention provides a rich design space for interaction techniques, including distortion functions, additional content for presentation, and presentation algorithms.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 3 illustrates an example user interface and normal lens view in accordance with an aspect of the present invention.

FIG. 4 illustrates an example user interface and instant lens view in accordance with an aspect of the present invention.

FIG. 5 illustrates an example user interface and dynamic lens view in accordance with an aspect of the present invention.

DETAILED DESCRIPTION OF THE INVENTION

The present invention relates to a system and methodology for dynamic presentation of search result information within a selected area of a display. In one aspect, a computerized interface for data presentation is provided. The system includes a lens component associated with a portion of a user interface display, wherein the lens component defines an area to display information from at least one search result. A layout component displays a detailed subset of information within the lens component based upon the search result. In one example, user-supplied parameters support a lens viewing area that provides more detailed information for search items appearing in the lens. Search results appearing outside the lens may be de-emphasized or minimized in order to balance the need to examine a collection of results and minimize scrolling actions to observe the results while also promoting more detailed information from search items appearing in the lens.

As used in this application, the terms "component," "lens," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
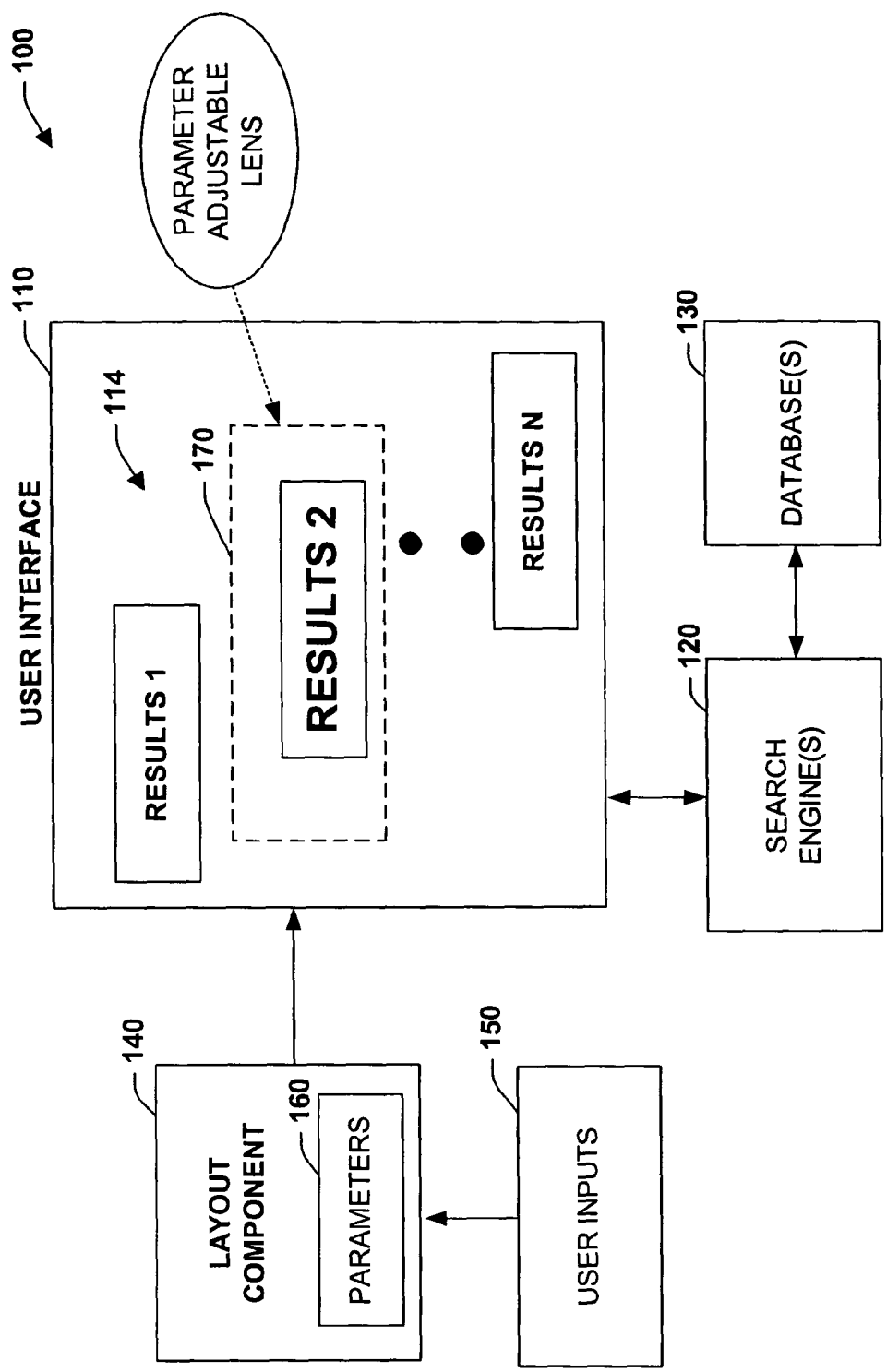
FIG. 1 is a schematic block diagram of a wave lens system in accordance with an aspect of the present invention.

Referring initially to FIG. 1, a wave lens system 100 is illustrated in accordance with an aspect of the present invention. The system 100 includes a user interface 110 that displays search results 114 from one or more search engines 120 that retrieve information from one or more databases 130. The search engines 120 can conduct local searches of information from the databases 130 and/or conduct remote searches such as across the Internet, for example. A layout component 140 controls display of the results 114 at the interface 110. This includes receiving user inputs 150 that operates, alters, and/or selects display of the results 114. Also, the user inputs 150 may select/adjust one or more parameters 160 that define operations of the interface 110 and display of results 114. Such parameters can include lens size, shape, location, magnification factor, rates for previewing text, as well as other parameters that are described in more detail below.

The parameters 160 operate in part to define a parameter adjustable lens 170 (or lens) for viewing a particular result or results in more detail from a plurality of other results 114. For example, the lens 170 may define an area around a search result 114 that is identified in a central area of a user's focus although substantially any area on the user interface 110 can be selected (e.g., X and Y coordinates defining rectangular or square lens region, radius of a circle at given coordinates defining circular or elliptical region, and so forth). Result information inside the lens 170 can be provided in more detail such as with additional text or data while results outside the lens can be de-emphasized (e.g., minimized text or font size on results outside lens), if desired. As can be appreciated, the lens 170 can be substantially any size or shape suitable for defining an area within the user interface 110. Also, more than one lens can be defined for a given interface 114, if desired. Furthermore, substantially any type of information or content can be captured and presented to the user. For example, example content can include query-relevant text insertion, thumbnails of web pages, information about size of the result, download speed, recency of the page, and so forth.

In general, the wave lens system 100 can be designed to help users assess and interpret lists of search results. One aspect of design determines what information to present (e.g., what text or other page attributes to show). Another aspect of design determines how to present the additional information (e.g., what interaction control to use and the dynamics of presentation). Thus, the wave lens system allows for highly interactive progressive exposure of additional content for search results. It is to be appreciated that the user interface 110 may include a display having one or more display objects including such aspects as configurable icons, buttons, sliders, input boxes, selection options, menus, tabs and so forth having multiple configurable dimensions, shapes, colors, text, data and sounds to facilitate operations with the system 100. In addition, the interface 110 can also include a plurality of other inputs or controls for adjusting and configuring one or more aspects of the present invention and as will be described in more detail below. This can include receiving user commands from a mouse, keyboard, speech input, web site, remote web service and/or other device such as a camera or video input to affect or modify operations of the interface or other aspects of the system 100.

FIGS. 2-6 illustrate various example user interfaces that illustrate one or more automated search displays and lens configurations. It is to be appreciated however, that the present invention is not limited to the examples shown and described herein. Furthermore, several aspects of the invention involve interaction and presentation dynamics which are difficult to illustrate in static screen shots. For example, as noted above, a lens region on a display can be located in various regions of the display and the lens shape can have various different sizes or shapes.

Figure 2:
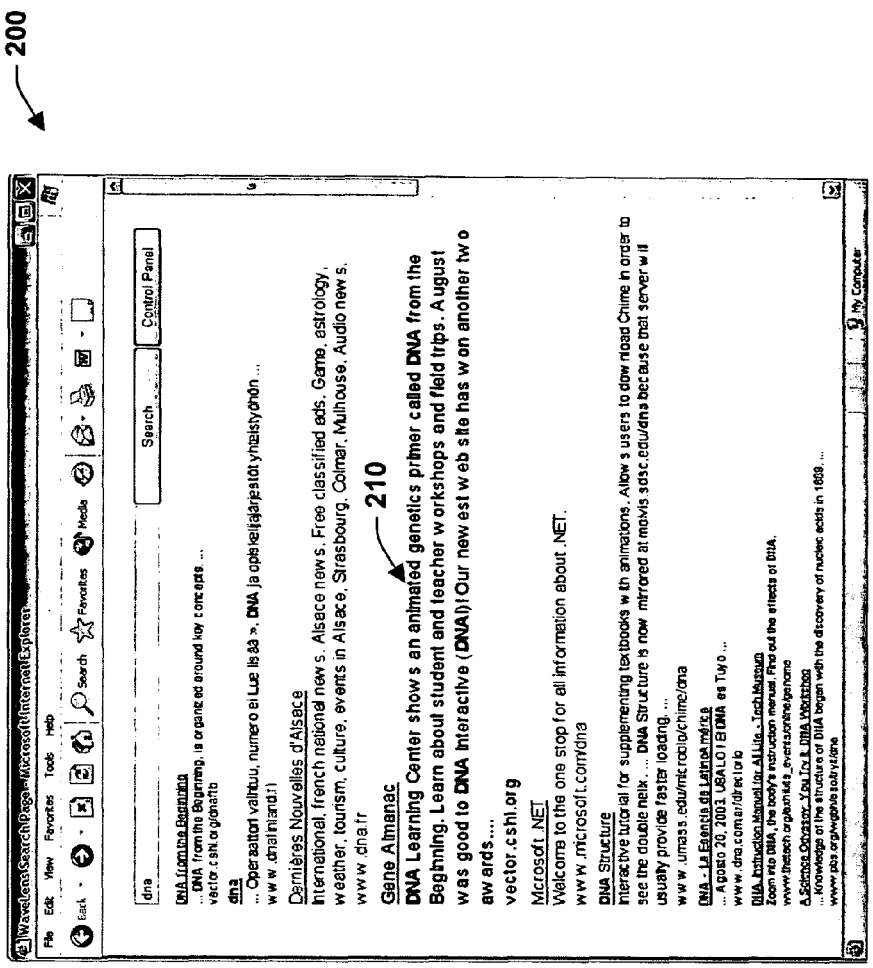
FIG. 2 illustrates an example user interface and lens view in accordance with an aspect of the present invention.

Referring to FIG. 2, an example results display 200 is illustrated depicting a lens region 210 for displaying more detailed information with respect to a given search result. In one aspect, a fisheye lens (or other type) is applied vertically, generally not horizontally, around a focal center such as at 210. In the case of a search result list, the focal center can include one result item comprising a title, description, and URL of a web page, as shown in FIG. 2. The focal center 210 is flat in this example, since all the components (title, description, URL) receive the same magnification. Non-uniform magnification is also possible. Since the peripheral context, in this case, results below and above the focal center 210, is decreased in a piecewise fashion, a wave lens technique in accordance with the present invention constitutes a type of piecewise fisheye view. Parameter settings, however, allow designers to not only change the magnification factor above and below the focal center independently, but also to fix a minimum font size so as to maintain readability of the text. Generally, a tradeoff prevails between the readability of search results, and fitting more results into a window frame. FIG. 2 demonstrates how parameters can be adjusted to generate a traditional fisheye view around a search result, where items above and below are gradually smaller so as to display more items in the window frame. For example, a minimum font size in FIG. 2 can be set as 8 point San-Serif.

Along with the magnification factor, the rate of magnification can be controlled by using the factor as a target and incrementally adjusting the zoom until the target is reached. In a web browser, the effect is animated text that enlarges and settles into its maximum size. While the magnification rate controls the speed at which zooming occurs, another parameter, based on the shape of the magnification function, controls the size of the zoom increments. With a step function, the text can quickly jump to the maximum magnification factor upon mouse action. Other geometric and exponential functions allow the text to grow and settle in at varying acceleration.

A delay parameter controls the onset of the zoom. If the delay is set to zero and magnification is tied to a mouse hover event, as the cursor moves over each search result, a wave, with the result focused at the crest, appears to follow the direction of the mouse. Thus, the wave lens technique derives its name from this effect. In addition to being able to control the number of results visible without scrolling using a fisheye lens, the wave lens technique addresses the need for more description text by managing the progressive insertion of additional content based on mouse activity. Just as zooming can be initiated by a mouse hover or click event, so can the onset of content insertion. As such, it is incumbent upon the designer to decide how best to couple content insertion with the gradual zooming of a focused result. This can be achieved by assigning parameters such as words per second and zoom speed or smoothness wherein a layout component adjusts the display based upon the parameters. Similar to zooming, content insertion can be adjusted according to the rate of insertion, as well as the size of the chunks (i.e., whether the increments should be in words or phrases). A delay parameter directs the onset of the insertion.

Conversely, the opposite of content insertion is content deletion, which can be keyed off a mouse hover, voice command, or click event, for example. Deletion does not extend beyond the original content of the search result. When content deletion is tied to a mouse hover event, it can commence when the cursor enters a different search result item or when the current focus is lost. This flexibility allows a user to simply move the cursor outside of the window frame to initiate deletion. When content deletion is tied to a mouse click event, it can begin when the user either clicks on the description or on another result. Like content insertion, content deletion can proceed all at once or at a specified rate with a specified onset delay. The delay was found to be useful in cases where, if the extra content that is added tends to be lengthy, as the user zooms in on another item and de-magnifies the current focus, it tends to shrink the focus too quickly. One other parameter allows the inserted content to persist and continue to augment with further mouse activity, or to be deleted all at once.

The wave lens technique can be implemented in DHTML using IE5 and DOM, for example. Client-side code can be written in JavaScript and a server-side ASP.NET C# web application pre-fetches web pages and extracts text for insertion. A control panel (not shown) allows designers to adjust the many flexible parameters in wave lens. For purposes of experiment, some of the parameters as summarized in Table 1 were fixed, which is described in more detail below.

Figure 3:
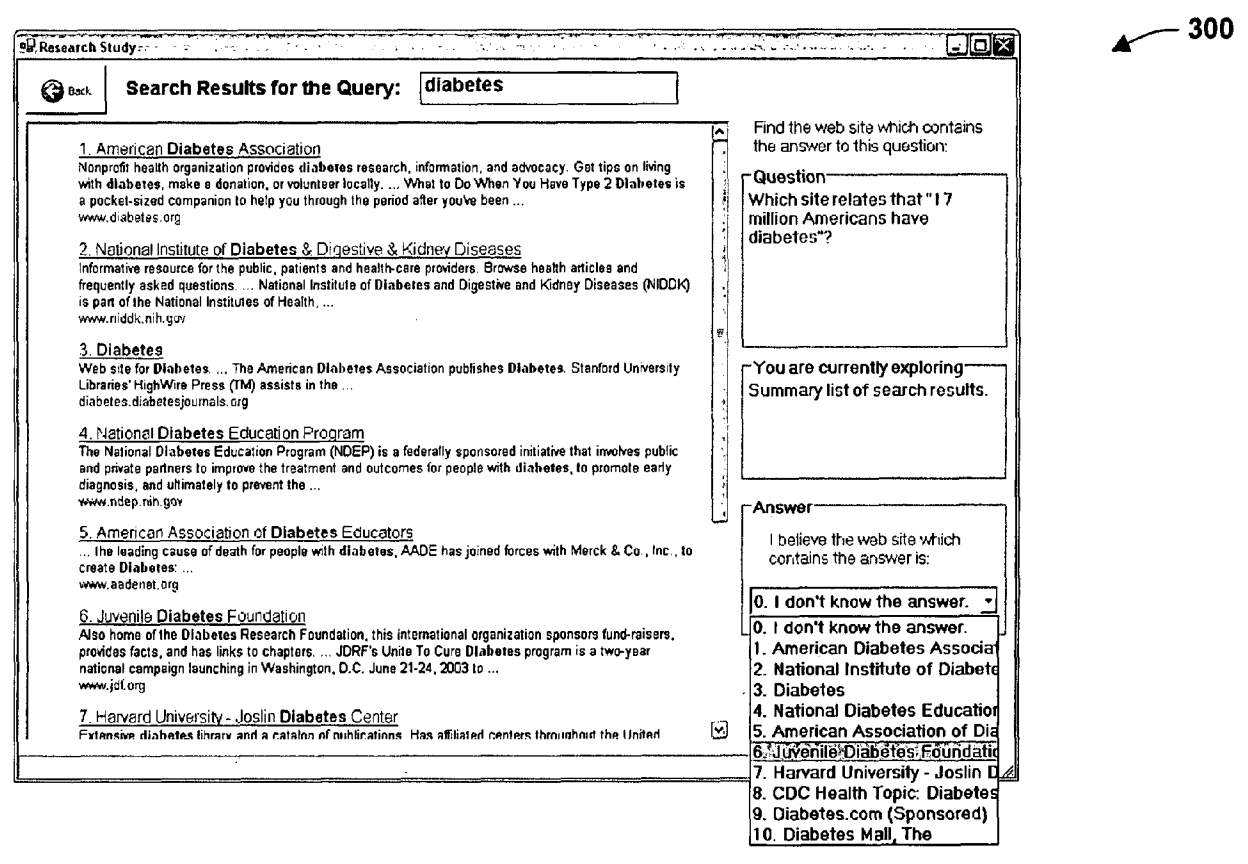
Figure 4:
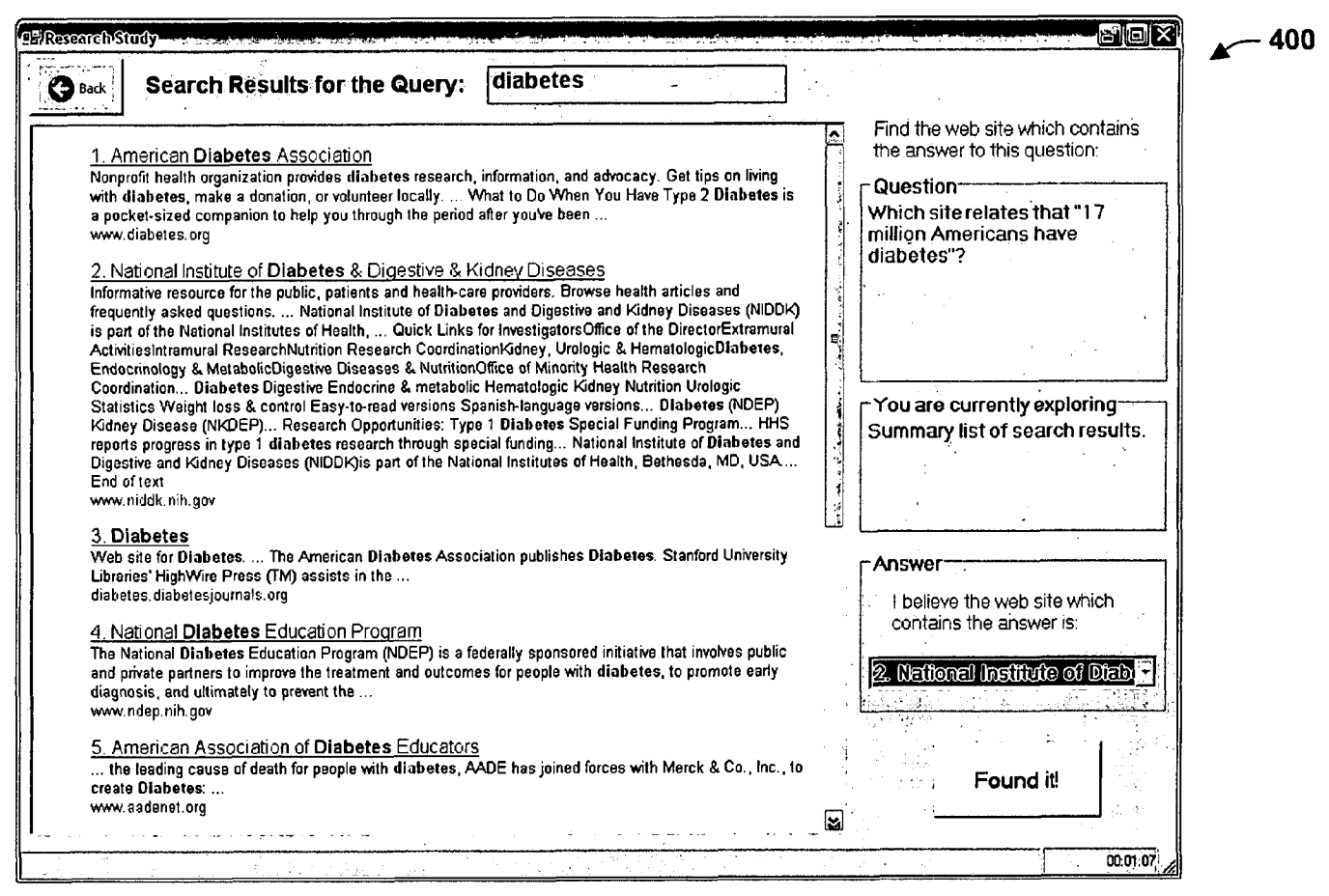

FIGS. 3-5 are example result pages having differing results and display criteria. FIG. 3 displays what is described below as a Normal view 300, whereas FIG. 4 displays an Instant view 400 and FIG. 5 displays a Dynamic view 500. To assess the usability of the wave lens technique described above, a controlled experiment was conducted in which participants engaged in a search task using a list of Internet search results. All questions had answers that could be found in one search result on the list. The location of the answer was controlled with two binary variables: Require Scrolling, indicating whether or not the target result containing the answer required scrolling to be found, and Answer Location, indicating whether or not the answer was readily available in the usual description text or required examining additional content invoked by mouse action.

Since the wave lens technique can be guided by a number of flexible parameters, part of the purpose of the experiment was to consider points in the parameter space to be both functional as real designs and theoretically interesting to compare and contrast. Two points were selected that varied along two dimensions: first, the amount of text that was inserted into the description, and second, the interaction style, which couples the type of mouse action that triggers the insertion with a magnification factor. These two points are referred to as wave lens Instant and Dynamic views 400 and 500 respectively.

In the Dynamic view 500, the interaction style is coordinated with the amount of text so as to progressively insert text into the description the longer the mouse hovers over a particular result. When the mouse moves to another result and hovers, the new focus not only increases in magnification and content, but also the old focus shrinks back to its original state. Using a minimum font size of 8 point San-Serif, the magnification factor for the dynamic view was set to 1.7. The onset of content deletion was delayed for 3 seconds and then advanced by phrases at a 100 millisecond rate, for example. In the Instant view, all of the additional text is displayed simultaneously. The interaction style is a mouse click with no zoom (i.e., a magnification factor of 1). When another search result is clicked, additional text or content for that item is inserted for the new focus and removed from the old focus. Table 1 summarizes the differences between the views. In the case of the Normal view, by "additional text or content," the actual web page is described.

TABLE 1

Summary of parameter settings for the Normal, Instant and Dynamic views.

|  | Normal | Instant | Dynamic |
| --- | --- | --- | --- |
| Magnification factor | 1 | 1 | 1.7 |
| Minimum font size | 10 | 10 | 8 |
| Additional text | Actual web page | Query-relevant phrases | Query-relevant phrases |
| Trigger for additional text | Mouse click | Mouse click | Mouse hover |
| Delay for additional text | 0 | 0 | 1500 msec |
| Rate of additional text | All at once | All at once | 750 msec/phrase |
| Trigger for loss of text | Mouse click | Mouse click | Mouse hover |
| Delay for text loss | 0 | 0 | 3 sec |
| Rate of text loss | All at once | All at once | 100 msec/phrase |

The Instant and the Dynamic views 400 and 500 were selected to examine the effect of animation as magnification and text content increased and decreased. It is noted that the Instant view 400 maintains the benefits of additional content without involving animated zoom, which characterizes the Dynamic view 500. In addition to the two wave lens views, a view that is typical of the current practice of using static style sheets to display search results, which are called the Normal view as displayed in FIG. 3. In the Normal view 300, the full web page (including both text and graphics) is shown when the title hyperlink is selected. The full web page replaces the list of search results, and a back button is used to return to the search results list.

With respect to style sheet, the Instant view 400 utilized a similar style sheet for the title, description, and URL as the Normal view. The Dynamic view 500 starts off looking similar to the Normal view, but changes as the user interacts with results to show more of some and less of others. As noted above, FIG. 3 displays a Normal view whereas, FIG. 4 shows a fully expanded Instant view with the same style sheet as the Normal view. FIG. 5 displays a fully expanded Dynamic view, which features the same additional content as the Instant view, but magnified. For that particular result, at a magnification rate of 50 milliseconds with a 1 second delay, and an insertion rate of 750 milliseconds with a 1.5 second delay, the full expansion took less than 4 seconds to complete. Note also that in the Dynamic view 500 of FIG. 5, the content of surrounding results can be reduced in size.

FIGS. 6-9 illustrate search performance results with respect to the various display modes described above with respect to FIGS. 3-5. In this aspect, search completion time was defined as the total amount of time from receiving a particular test question to clicking a "Found It" button after having selected an answer in a drop down box. Also, a one-way ANOVA test was performed on the correct and completed questions (i.e., those questions to which participants did not answer "I don't know") and found main effects for Interface ($F_{2,304}$=3.92, p<0.05), Require Scrolling ($F_{1,304}$=4.93, p<0.05), and Answer Location ($F_{1,304}$=15.47, p<0.001).

Figure 6:
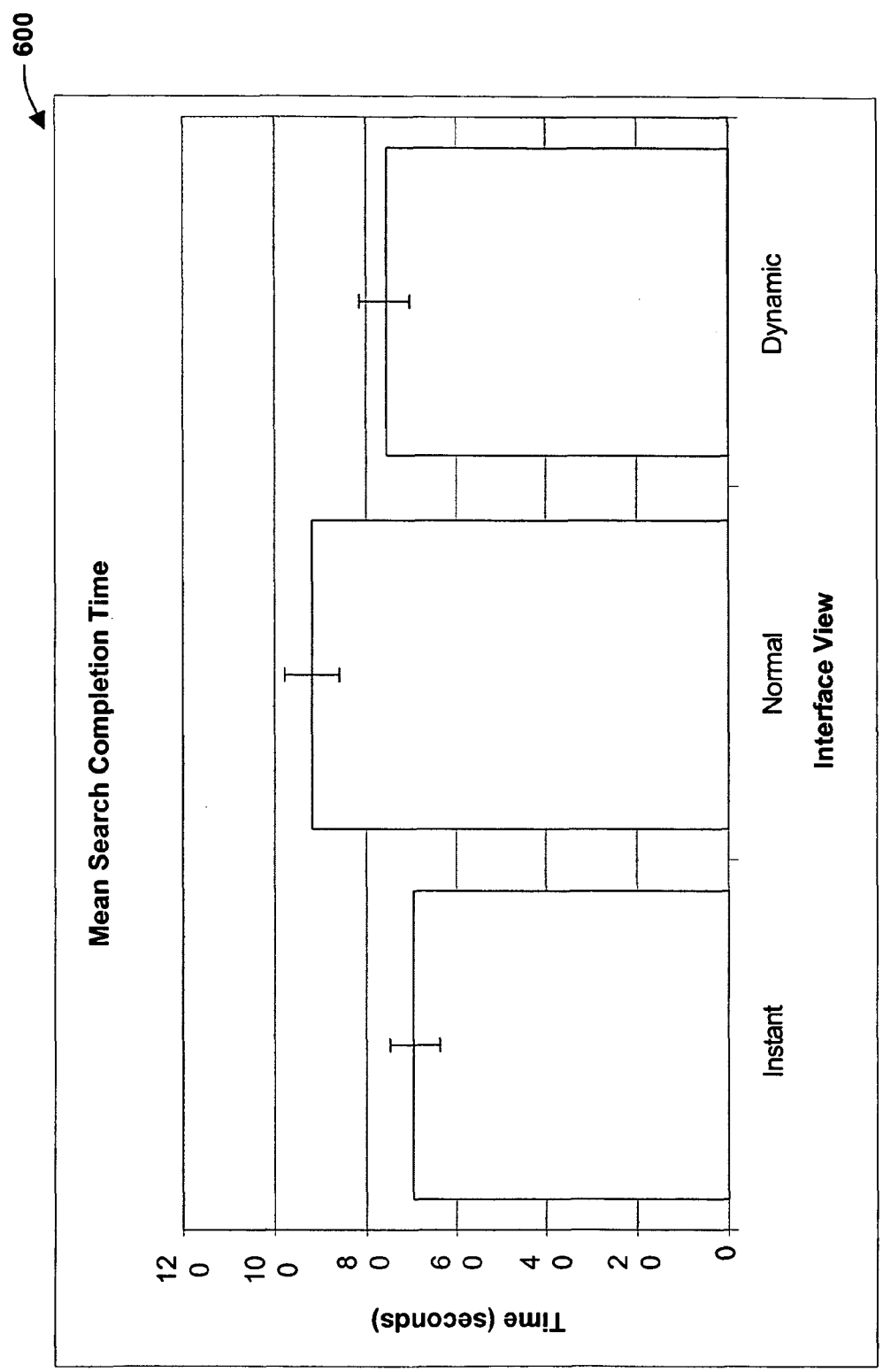
FIGS. 6-9 illustrate example performance data for a wave lens view system in accordance with an aspect of the present invention.

FIG. 6 illustrates a graph 600 that shows mean search completion times for the three views. Participants completed search tasks in an average of 69.6 secs, 75.8 secs, and 92.0 secs for the Instant, Dynamic and Normal conditions, respectively. Both Wave Lens conditions were faster than the Normal condition in spite of the fact that participants were familiar with the Normal view. Post hoc multiple comparisons using a Tukey test revealed a significant difference between the Normal and Instant views (p<0.05). The difference between the means of the Normal and Instant condition is 22.4 seconds, which represents a roughly 25% advantage.

Even though all web pages and additional summary content were cached locally, load times differed slightly across conditions. In the case of the Normal view, graphics such as images take longer to load than text. In the case of the Dynamic view, additional content was not shown for 1.5 seconds after hover and then it was shown progressively, both of which require additional time. Average Normal view downloads were less than 2 seconds and full expansion took less than 3 seconds in the Dynamic view. Since the mean number of clicked items in the Normal view was 2.2, load time differences are not enough to account for the 22.4 difference between Normal and Instant views. Load time differences could, however, account for the lack of a significant effect between the Dynamic and the Instant views, given the parameter settings used for the experiment.

Figure 7:
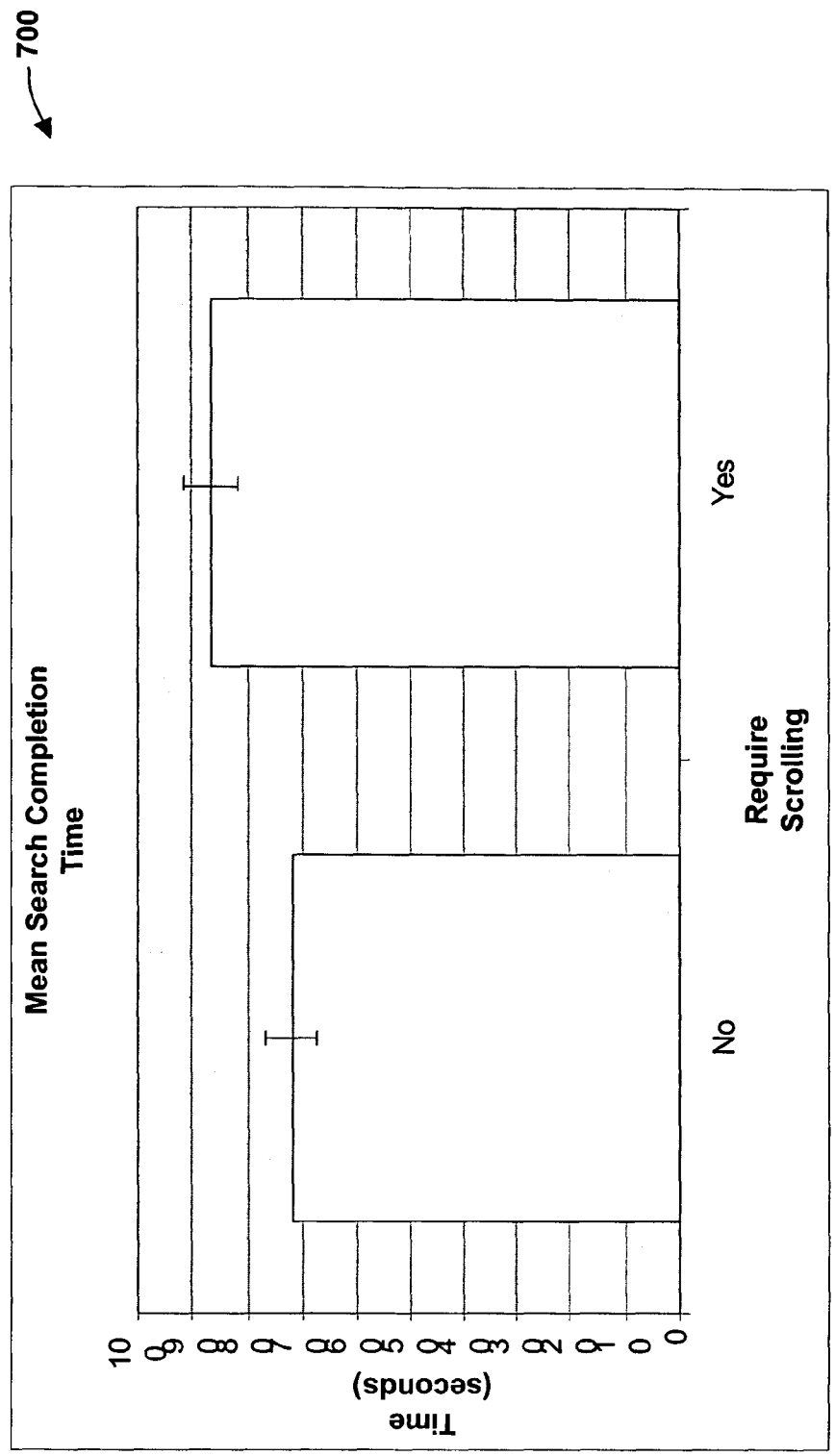
Figure 8:
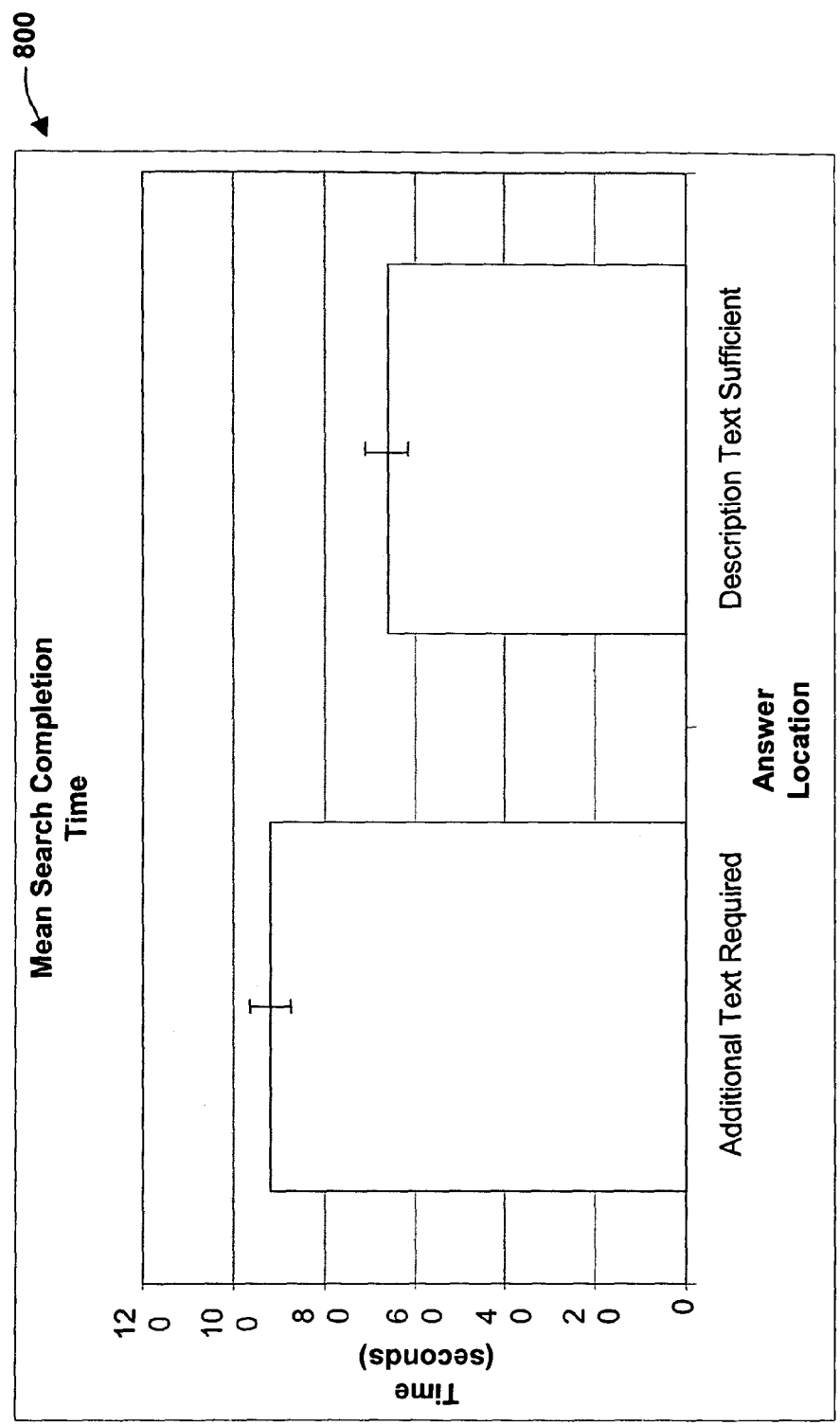

FIG. 7 illustrates a graph 700 that shows mean search completion time for Require Scrolling, and FIG. 8 illustrates a graph 800 that shows the same for Answer Location. The difference between means is 14.6 and 25.8 secs respectively. While the main effect for Answer Location is not surprising, the main effect for Require Scrolling is somewhat unexpected given the low cost and quickness of scrolling.

When participants gave up on some questions by selecting an "I don't know" option, they responded as such to 18.4% of the questions in the Normal view, 8.3% of the questions in the Instant view, and 6.9% of the questions in the Dynamic view. Hence, participants not only performed slightly worse on the Normal view than the other two, but they were more than twice as likely to give up. Since most of the "I don't know" responses came after the 3 minute timer reminded participants that they could give up, the differences in search time in practice may be larger than those noted above. For questions in which participants found an answer, it was scored whether their selection of the answer page agreed with a predetermined selection. The error rates were 18.7%, 14.4%, and 16.4% for the Normal, Instant, and Dynamic views respectively. This represents conservative scoring since answers might have been found on other pages. One point for interpreting completion time is that the error rates were comparable across conditions.

For all questions, the amount of time the mouse was spent on each search result for the Normal, Instant, and Dynamic views was recorded. The mean dwell times were 39.6, 43.1, and 39.6 seconds respectively, with no significant differences. Between participants, individual differences were observed in the way the mouse was used; e.g., some people used their mouse to guide reading, and others simply did not.

With respect to graph 600 of FIG. 6 previously discussed, the Instant view outperformed the others on both quantitative and qualitative measures. Since the parameters for the Instant view were set to tease apart the benefit of providing additional page content from interaction style, it would seem that participants prefer to have all the content on demand rather than to try to fit more results in the window frame and progressively reveal additional content. However, it is noted that the Dynamic view represents just one point in the parameter space, and other parameter settings can be adjusted for dynamic information presentation. For example, in one experiment, content was progressively deleted when the mouse was placed outside the focus region, which prompted several participants to comment that this was unexpected; it might be easier to delete text only when new text is inserted. Furthermore, spaces between search results where users can rest their mouse without initiating animated zoom can be highlighted, if desired.

Figure 9:
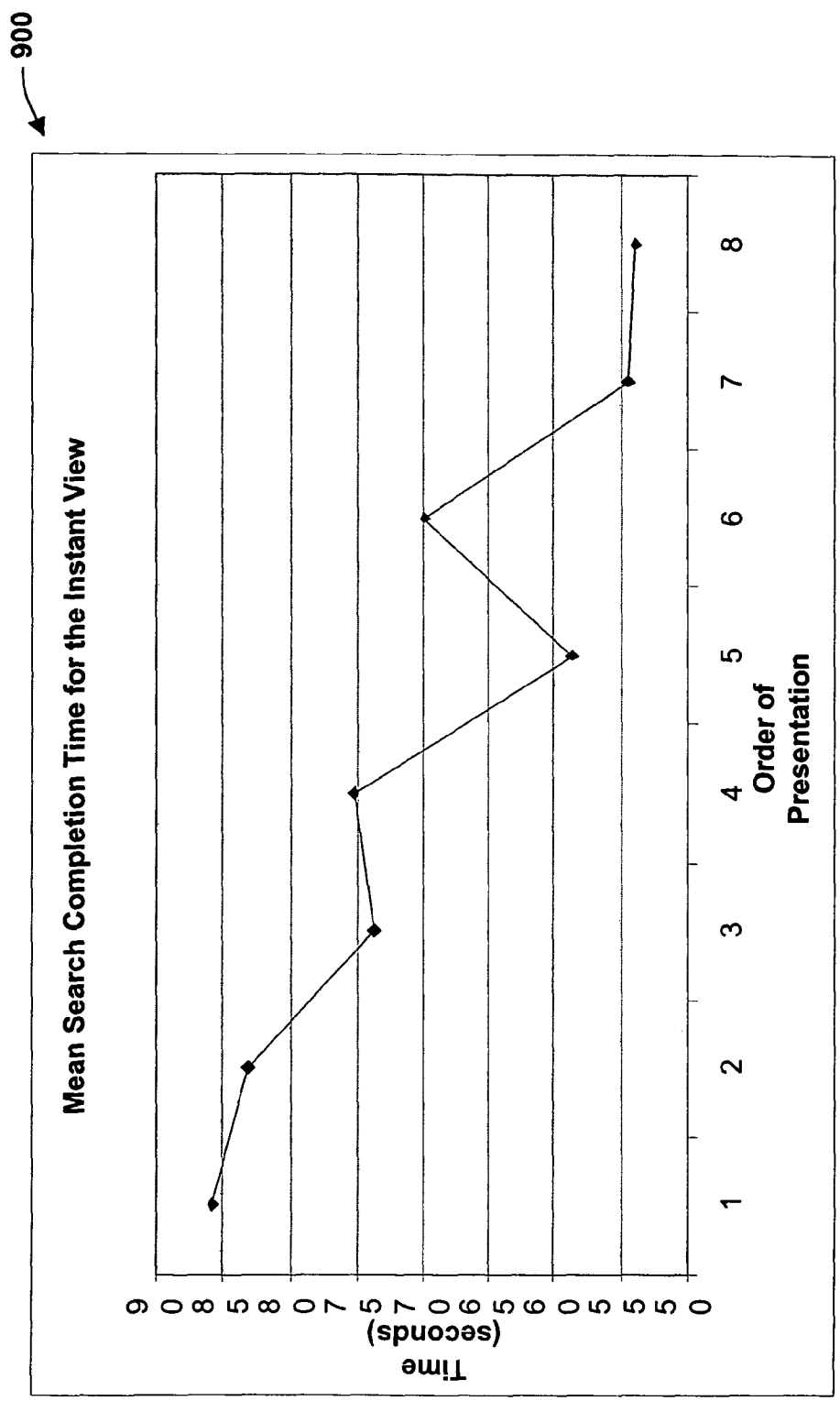

It is noted that the Instant view also required training to get used to, as revealed in a main effect for order of presentation ($F_{7,292}$=2.52,p<0.05). FIG. 9 displays a graph 900 that is a plot of the mean search completion time as participants received more search tasks in the Instant view, which shows a downward trend towards faster completion time. No item effect was observed, and questions were randomly generated. One possible explanation for this trend is that participants learned to be more selective about which search results to expand for additional content since oftentimes, the extracted text was lengthy. This learning apparently did not occur for the Dynamic view.

It is noted that the above findings for the retrieval and display of search results is that wherever possible, additional content should be retrieved and made readily available to users on demand. While some of the participants preferred the Dynamic view, an informal impression was that these participants were less experienced web searchers. There may be very useful cases for the fisheye lens zoom effect for perusing search results, but having progressive insertion of content did not seem to improve search completion time (although it is difficult to tell since zooming was confounded with text insertion). With current data, the Instant view seemed to be the best view onto search results.

Figure 10:
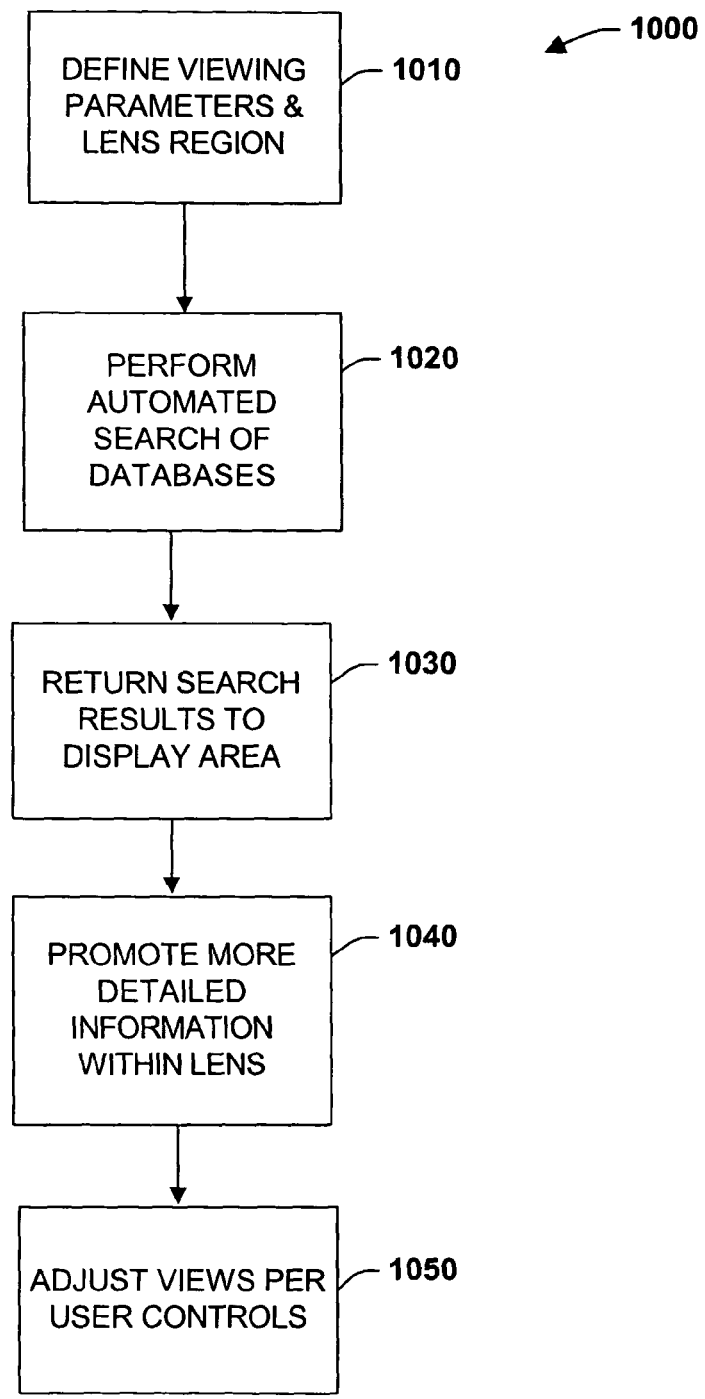
FIG. 10 is a flow diagram illustrating a lens viewing process in accordance with an aspect of the present invention.

FIG. 10 is a flow diagram illustrating a lens view process 1000 in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 1010, one or more viewing parameters are defined for displaying and controlling output from search results. This can include defining a lens region for display, however, predetermined lens configurations can be provided (e.g., a lens that focuses at the top, middle or bottom of a display). As noted above, other parameters can include magnification factors, content addition and deletion rates, for example, as well as how content or data should be scrolled while being read by the user. At 1020, an automated search is performed on one or more local or remote databases. At 1030, results from the search are returned to a display area or buffer region in memory in preparation for display. At 1040, returned search items (or item) falling in the defined lens region is magnified or highlighted or otherwise promoted over those items appearing outside the lens. For example, this can include providing more detailed information for those items appearing inside the lens than conventional search results and showing such information in a bolded, highlighted, or other form to indicate items appearing in the lens. At 1050, various user adjustments can be processed to alter the display characteristics of the lens and/or items appearing outside the lens. For example, the size or location of the lens can be adjusted as well as other parameters that affect how and when information is presented to the user from within the lens.

Figure 11:
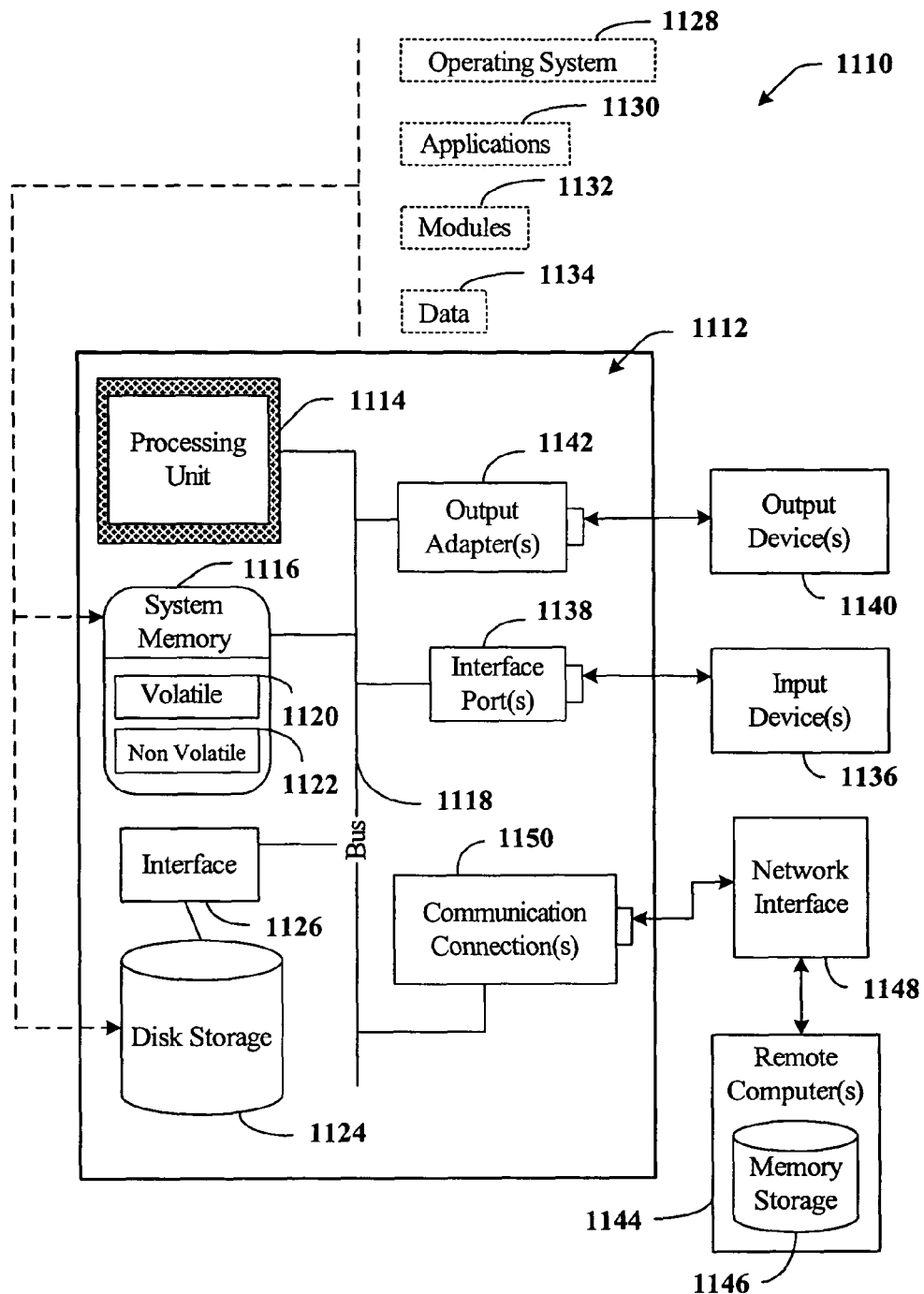
FIG. 11 is a schematic block diagram illustrating a suitable operating environment in accordance with an aspect of the present invention.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
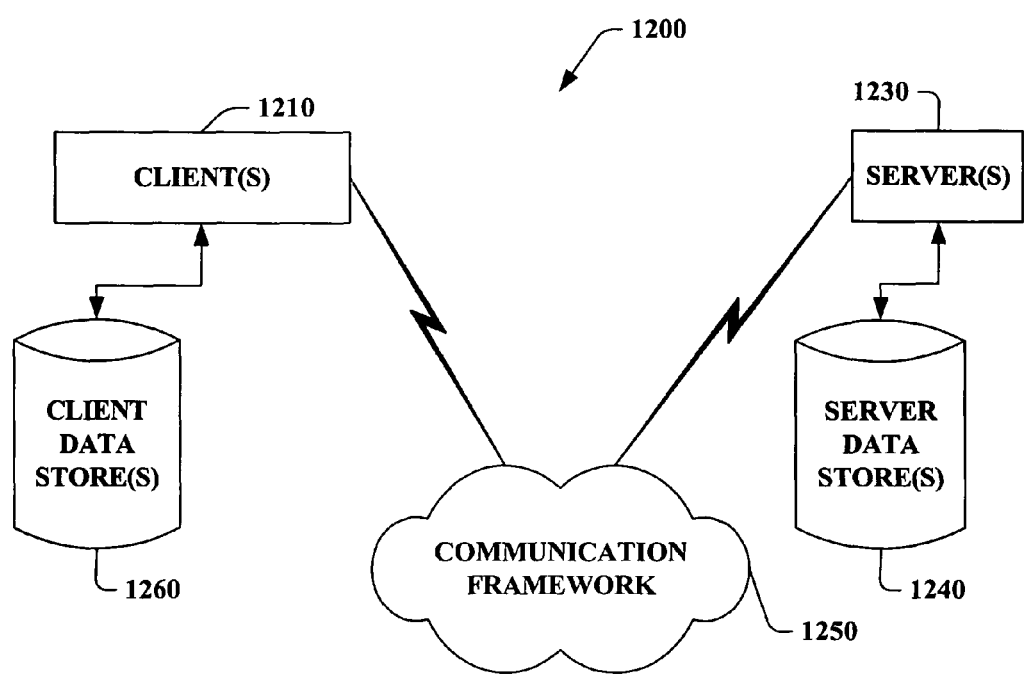
FIG. 12 is a schematic block diagram of a sample-computing environment with which the present invention can interact.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented interface for data presentation embodied on a computer-readable storage device, the computer-implemented interface comprising:
    a lens component associated with a portion of a user interface display, wherein the lens component defines an area to display information from at least one search result; and
    a layout component that displays a detailed subset of information, comprising textual information, within the area defined by the lens component based upon the at least one search result, wherein the detailed subset of information is animated to magnify a size of the detailed subset of information and to progressively insert additional textual information associated with the at least one search result into the detailed subset of information based at least partly on an amount of time a mouse hovers over the at least one search result, wherein a rate of magnification of the detailed subset of information is determined based at least in part on a magnification factor, wherein a zoom is incrementally adjusted based at least in part on the rate of magnification until a target is reached, wherein the additional textual information to be progressively inserted into the detailed subset of information is selected from the at least one search result based in part on a query associated with the at least one search result, and wherein the additional textual information being additional as compared to the amount of information displayed for the at least one search result outside of the area defined by the lens component.

2. The computer-implemented interface of claim 1, further comprising at least one search engine and at least one local or remote database to retrieve the search result.

3. The computer-implemented interface of claim 1, wherein the layout component receives user inputs that operates, alters, or selects display criteria of the lens component and other search results.

4. The computer-implemented interface of claim 3, further comprising one or more parameters that affect the display criteria.

5. The computer-implemented interface of claim 4, wherein the one or more parameters include at least one of a lens size, a lens shape, a lens location, a magnification factor, a presentation rate, a delay, a trigger, or a minimum font size.

6. The computer-implemented interface of claim 1, further comprising at least one other lens component to display information.

7. The computer-implemented interface of claim 1, wherein the lens component is defined as a fisheye lens that is applied vertically to a display at about a focal center of the display.

8. The computer-implemented interface of claim 7, wherein the focal center includes one result item comprising a title, description, and URL of a web page.

9. The computer-implemented interface of claim 7, wherein the fisheye lens is associated with a piecewise view.

10. The computer-implemented interface of claim 1, wherein the detailed subset of information displayed within the area defined by the lens component increases in size based at least in part on the amount of time that the mouse hovers over the at least one search result until a maximum size is reached.

11. The computer-implemented interface of claim 1, further comprising a parameter that controls a size of zoom increments.

12. The computer-implemented interface of claim 11, wherein the zoom increments are controlled with a step function.

13. The computer-implemented interface of claim 11, further comprising geometric or exponential functions that allow the detailed subset of information to grow or settle at varying acceleration.

14. The computer-implemented interface of claim 11, further comprising a content insertion parameter that is adjusted according to a rate of insertion or according to a size of information chunks.

15. The computer-implemented interface of claim 1, further comprising a control panel to allow designers to adjust display parameters for the lens component and the layout component.

16. The computer-implemented interface of claim 1, further comprising a display output associated with at least one of an instant information view or a dynamic information view.

17. The computer-implemented interface of claim 16, wherein the dynamic information view is coordinated with an amount of additional textual information associated with the at least one search result to progressively insert into the detailed subset of information based at least partly on the amount of time the mouse hovers over the at least one search result following a time delay controlled by a preset delay parameter.

18. A computer-implemented system for displaying query results, comprising:
   at least one hardware processor; and
   one or more computer-readable storage media maintaining at least one module that is executable by the at least one hardware processor to perform acts comprising:
      retrieving search results from a database, each search result of the search results comprising textual information associated with the respective search result;
      processing the search results in accordance with a lens;
      displaying at least one search result from within the lens and other search results outside the lens;
      progressively inserting additional textual information associated with the at least one search result for display within the lens based at least partly on an amount of time a mouse hovers over the at least one search result, the additional textual information associated with the at least one search result displayed within the lens as compared to other search results displayed outside the lens, wherein the additional textual information to be progressively inserted is selected from the at least one search result based in part on a query associated with the at least one search result; and
      animating the at least one search result displayed within the lens to magnify the at least one search result in size as compared to other search results outside the lens, wherein a rate of magnification for the at least one search result is determined based at least in part on a magnification factor, wherein a zoom is incrementally adjusted based at least in part on the rate of magnification until a target is reached.

19. A method for automatic search result organization, comprising:
   defining a plurality of parameters for displaying search results, each search result comprised of first content associated with the respective search result, the first content comprising subsets of the first content where each subset is associated with a content type;
   defining a lens region to display one or more of the search results;
   displaying at least one search result of the search results within the lens region and at least one other search result outside the lens region;
   progressively inserting additional content associated with the at least one search result for display within the lens region based at least partly on an amount of time a mouse hovers over the at least one search result, an onset of the progressively inserting of the additional content following a time delay controlled by a preset delay parameter, the additional content associated with the at least one search result displayed within the lens region, wherein the additional content to be progressively inserted within the lens region is selected from the at least one search result based in part on a query associated with the at least one search result; and
   animating a portion of the first content and the additional content displayed within the lens region to magnify a size of the portion of the first content and the additional content as compared to second content associated with the at least one other search result displayed outside the lens region, wherein a rate of magnification associated with the lens region is determined based at least in part on a magnification factor, wherein a zoom is incrementally adjusted based at least in part on the rate of magnification until a target is reached.

20. The method of claim 19, wherein the plurality of parameters include at least one of a lens size, a lens shape, a lens location, the magnification factor, a viewing rate, a delay, a trigger, or a minimum font size.

21. The method of claim 20, further comprising providing a focal center for the lens region.

22. A computer-implemented graphical user interface embodied on a computer-readable storage device, the computer-implemented graphical user interface comprising:
   one or more data items and results respectively associated therewith retrieved from a database, each of the one or more data items comprising text associated with a respective result;
   one or more display objects created for the one or more data items;
   an input component for selecting the one or more data items and parameters respectively associated with each of the one or more data items; and
   a lens component to present a display object of the one or more display objects in a different format with respect to a collection of the one or more data items, the different format comprising animation of the display object to magnify the display object in size and modify the display object to progressively insert additional text associated with a data item corresponding to the display object based at least partly on an amount of time a mouse hovers over the display object, wherein the additional text to be progressively inserted is retrieved from a result to be included in the display object based in part on a query associated with the result, and wherein a rate of magnification of the display object is determined based at least in part on a magnification factor, wherein a zoom is incrementally adjusted based at least in part on the rate of magnification until a target is reached.

23. The computer-implemented graphical user interface of claim 22, further comprising controls for interacting with a search engine, a database, the one or more display objects, or the lens component.

24. The computer-implemented graphical user interface of claim 22, wherein the one or more display objects are associated with at least one of text insertion, query-relevant text insertion, thumbnails of a web page, information about a size of a result, a download speed, or a recency of a page.

* * * * *